April 30, 1940.   S. GUARNASCHELLI   2,198,996
COUPLING
Filed Nov. 15, 1938

INVENTOR
Stephen Guarnaschelli
BY
Marshall & Hawley
ATTORNEYS

Patented Apr. 30, 1940

2,198,996

UNITED STATES PATENT OFFICE 2,198,996

COUPLING

Stephen Guarnaschelli, Elmhurst, N. Y., assignor to Packless Metal Products Corporation, New York, N. Y., a corporation of New York Application November 15, 1938, Serial No. 240,434

1 Claim. (Cl. 285—84)

This invention relates to couplings and means for securing hose to couplings.

More particularly stated, the invention relates to couplings for rubber or rubber composition hose, such as is used for oil tanks or trucks. Oil is injurious to rubber and in time causes the rubber to disintegrate or become spongy or porous. When the hose has been so acted upon by the oil it must be replaced.

This invention has been worked out particularly for the purpose of making it possible to repair hose of the character described and to secure couplings thereto.

This invention has for its object to provide simple, practical and effective means for securing couplings to flexible hose, such as rubber hose.

Figure 1:
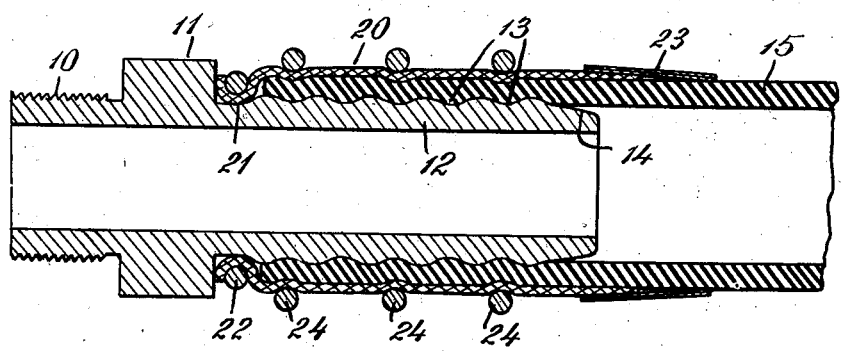
Figure 2:
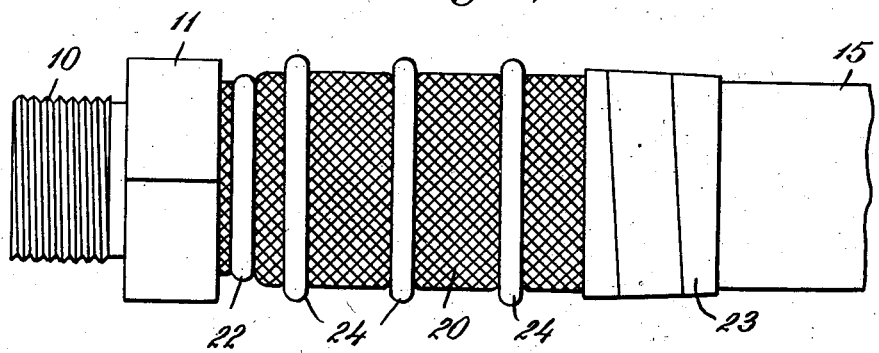

Further objects of the invention will appear from the following specification taken in connection with the drawing which forms a part of this application and in which, Fig. 1 is a longitudinal sectional elevation of a coupling of a hose and secured thereto in accordance with the invention; and Fig. 2 is an elevational view of the structure shown in Fig. 1.

Any desired form or type of coupling may be utilized and in the form of the invention shown, the coupling comprises an externally threaded end portion 10, a nut 11 and an enlongated shank 12.

The outer surface of the shank 12 is preferably grooved or corrugated, as shown at 13, and the end of the portion 12 is tapered, as shown at 14. One end of a hose 15, such as hose which has been injuriously affected by oil, is placed over the shank 12, the shank being so dimensioned as to form a tight fit within the hose.

A sheath or sleeve 20, preferably formed of woven metallic braid, is placed around the end of the hose 15 and extends into a groove 21 formed adjacent the inner end of the nut 11 and between the nut and the remaining portion of the shank. A clamp 22 of any suitable construction, such as a wire clamp, is secured around the inner end of the sheath 20 and the other end of the sheath is secured to the hose by suitable securing means, such as adhesive tape 23. The intermediate portion of the sleeve and the end portion of the hose 15 which surrounds the shank 12 is secured in place by suitable clamping means, such as wires 24. The sheath 20 forms a protecting cover around the hose and prevents the wires from cutting into the hose.

From the foregoing description it will be seen that a simple, practical and efficient means has been designed for securing a flexible hose, such as a rubber hose, to a coupling and that this means is so constructed and arranged that even though the hose is somewhat deteriorated in use it will be securely held on the coupling and will not be forced by internal pressure off of the coupling.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claim.

What I claim is:

In combination, a coupling member having a portion adapted to enter the end of a flexible hose, a flexible hose surrounding and mounted on said portion, a flexible sheath surrounding the end portion of hose and extending beyond the end of the hose, means for clamping said extending portion of the sheath directly to the coupling member, and means surrounding the sheath for tightly securing the sheath to the hose and the hose to the said portion of the coupling member.

STEPHEN GUARNASCHELLI.